(12) United States Patent
Tatara

(10) Patent No.: US 8,730,026 B2
(45) Date of Patent: May 20, 2014

(54) VEHICULAR LAMP

(75) Inventor: Naoki Tatara, Shizuoka (JP)

(73) Assignee: Koito Manufacturing Co., Ltd. (JP)

( * ) Notice: Subject to any disclaimer, the term of this patent is extended or adjusted under 35 U.S.C. 154(b) by 117 days.

(21) Appl. No.: 13/558,496

(22) Filed: Jul. 26, 2012

(65) Prior Publication Data

US 2013/0038445 A1     Feb. 14, 2013

(30) Foreign Application Priority Data

Aug. 10, 2011   (JP) .................. 2011-174681

(51) Int. Cl.
    *B60Q 1/26*     (2006.01)
    *B60L 11/18*     (2006.01)
    *B60Q 1/00*     (2006.01)

(52) U.S. Cl.
    CPC ............... *B60L 11/1816* (2013.01); *B60Q 1/00* (2013.01)
    USPC ....................................... 340/463; 340/425.5

(58) Field of Classification Search
    USPC .......................... 340/463, 426, 425.5; 701/36

IPC ............ B60Q 1/00,2200/00; G10K 1/00; B60L 11/1816
    See application file for complete search history.

(56) References Cited

U.S. PATENT DOCUMENTS 7,650,001 B2 *   1/2010   Yasushi et al. .................. 381/61

FOREIGN PATENT DOCUMENTS

| JP | 2007283809 | 11/2007 |
| JP | 2010186456 | 8/2010 |

* cited by examiner

*Primary Examiner* — Shirley Lu
(74) *Attorney, Agent, or Firm* — Cantor Colburn LLP

(57) ABSTRACT

The vehicular lamp of the present disclosure includes a lamp control unit configured to control the lighting state of the lamp, the sound generating device configured to generate an alarm sound from the lamp when the device is driven, and a sound generating control unit configured to control the sound generating device. The lamp control unit is configured such that a normal operation of the lamp control unit itself becomes impossible so as not to turn ON the lamp unit normally when a remodeling is performed to the sound generating control unit cutting off, for example, a power source line VW, a control line CW, and a driving line MW which are connected to the sound generating unit.

6 Claims, 4 Drawing Sheets

VEHICULAR LAMP

CROSS-REFERENCE TO RELATED APPLICATIONS

This application is based on and claims priority from Japanese Patent Application No. 2011-174681, filed on Aug. 10, 2011, with the Japanese Patent Office, the disclosure of which is incorporated herein in its entirety by reference.

TECHNICAL FIELD

The present disclosure relates to a vehicular lamp including a sound generating device that generates an alarm sound for other vehicles or pedestrians.

BACKGROUND

A vehicle that utilizes a motor as a drive source for operating such as, for example, a hybrid vehicle or an electric vehicle, is hardly recognized by other vehicles or pedestrians because a motor sound of the vehicle is silent at a lower speed. Accordingly, there is a problem that the presence of the vehicle cannot be recognized to other vehicles or pedestrians. In this regard, a technique has been proposed in which a different sound from the motor sound such as, for example, an analogous engine sound, is generated and used as an alarm sound for other vehicles or pedestrians. Japanese Patent Application Laid-Open No. 2010-186456 discloses a configuration in which a sound generating device is installed in a vehicle to generate a voice as an alarm sound when a driver manipulates a switch. Further, Japanese Patent Application Laid-Open No. 2007-283809 discloses a configuration in which an oscillator is provided in a component constituting a vehicle, and the component is vibrated by vibrating the oscillator at a controlled and desired timing to generate a sound according to the vibration of the component. An example of the component constituting a vehicle may include a head light cover which may be vibrated by the oscillator to function as a part of a speaker in the sound generating device.

SUMMARY

The sound generating device of Japanese Patent Application Laid-Open No. 2010-186456 relates to the technique in which the alarm sound is generated by the manipulation of the switch by a driver. Accordingly, when the driver forgets the manipulation of the switch or does not manipulate the switch intentionally, the sound generating device does not generate an alarm sound and the meaning of the installation thereof will be lost. In the sound generating device in Japanese Patent Application Laid-Open No. 2007-283809, the oscillator vibrates automatically to vibrate the head light cover, thereby ensuring the generation of an alarm sound. However, even in the technique disclosed in Japanese Patent Application Laid-Open No. 2007-283809, when a remodeling is performed, for example, to release the connection of a wiring connected to the oscillator, the alarm sound will not be generated. As a result, for example, when the driver feels the alarm sound generated at the lower speed to be tiresome and performs such a remodeling, the alarm sound will not be generated by the sound generating device even when it is necessary, and the meaning of the installation of the sound generating device will be lost.

The object of the present disclosure is to provide a vehicular lamp that makes an original function of a sound generating device to be executed by preventing a remodeling in which an alarm sound cannot be generated from being occurred in advance, in a vehicle including the sound generating device in which a lamp is vibrated to generate the alarm sound.

The present disclosure provides a vehicular lamp comprising: a lamp installed in a vehicle; a lamp control unit configured to control the lighting state of the lamp; a sound generating device installed in the lamp and configured to generate an alarm sound from the lamp when the sound generating device is driven; and a sound generating control unit configured to control the sound generating device. In particular, the lamp control unit is configured to make a normal operation thereof to be impossible when the sound generating control unit is not operated normally.

As a first exemplary embodiment in which the lamp control unit makes a normal operation thereof to be impossible when the sound generating control unit is not operated normally, a constitution is provided in which the lamp control unit and the sound generating control unit are integrally formed into a package, and a common power source line that supplies power to both of the control units and a common control line that controls both of the control units are drawn out of the package. As a second exemplary embodiment, the sound generating control unit includes an abnormality detecting unit configured to detect an abnormality of the sound generating control unit, and the lamp control unit includes a control stopping unit configured to stop the operation of the lamp control unit based on an abnormality detection signal from the abnormality detecting unit of the sound generating control unit.

According to the present disclosure, when a remodeling is performed to the sound generating device in order to stop generating the sound from the sound generating device, the lamp control unit is controlled so as to make a normal operation thereof to be impossible and the lamp may not be turned ON. Accordingly, the remodeling for the sound generating device may be prevented in advance, a normal operation of the sound generating device may be ensured, and a safety running of a vehicle may be ensured.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

First Exemplary Embodiment

Figure 1:
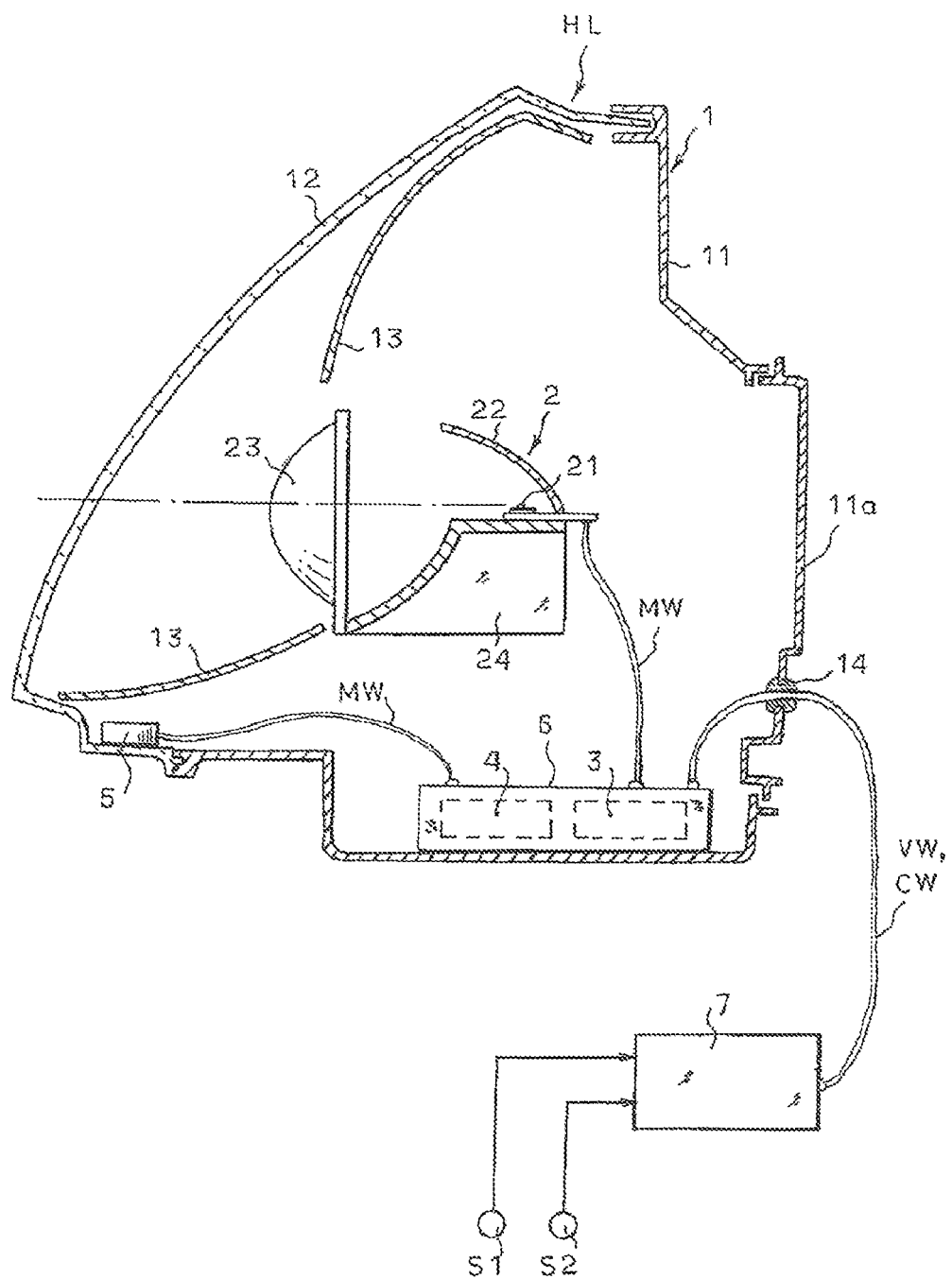
FIG. 1 is a longitudinal cross-sectional view of a head lamp according to a first exemplary embodiment of the present disclosure.

Hereinafter, exemplary embodiments of the present disclosure will be described with reference to the drawings. FIG. 1 is a longitudinal cross-sectional view of a first exemplary embodiment in which the present disclosure is applied to a head lamp HL of a vehicle. A lamp housing 1 includes a vessel-type lamp body 11 of which a front surface is opened, and a front cover 12 including a light transmitting resin attached to the front opening of the lamp body 11. A lamp unit 2 including a light source is provided internally in the lamp housing 1, and light emitted from the light source when the lamp unit 2 is turned ON is transmitted through the front cover to be irradiated to the front area. The lamp unit 2 is herein configured as a lamp unit of a projector type that irradiates light of a low-beam distribution and the detailed description thereof will be omitted. The lamp unit 2 includes a reflector 22 designed to be based on a surface of a ellipsoid of revolution, a light source 21 of, for example, a light emitting diode (LED) disposed within the reflector 22, an irradiating lens 23 configured to irradiate the light output from the light source 21 and reflected by the reflector 22 to the front area, and a base member 24 configured to support the light source 21, the reflector 22, and the irradiating lens 23 as a one-piece. A so called a lamp lighting state of the lamp unit 2, such as a turning ON and a turning OFF, is controlled by a lamp electronic control unit (a lamp ECU) 3. In a case where a head lamp includes a swivel device that swivel-controls the lamp unit 2 (control in the horizontal direction) or a leveling device that leveling controls the lamp unit 2 (control in the vertical direction), the lamp ECU 3 may further control the swivel device or the leveling device. The lamp ECU 3 may further control the lighting state of a lamp of, for example, a day time running lamp (DRL) that is automatically turned ON or driven when an ignition key of a vehicle is turned ON.

An analogous reflector (an extension) 13 is also internally provided in the lamp housing 1, which prevents an unnecessary exposure inside the lamp housing 1 when viewed from the front by transmitting the front cover 12 to improve an outer appearance of the lamp housing 1. A sound generating device 5 is disposed in a location which is not exposed from the outside by the extension 13, in a portion of an inner surface of the front cover 12. Herein, the sound generating device 5 is configured as an electron oscillator and vibrates by an electron action when an electric current is applied. As a result, the front cover 12 vibrates integrally along with the sound generating device 5, and generates a desired alarm sound using the front cover 12 as a sound generating plate. The electron oscillator 5 is configured such that the vibration thereof is controlled by a sound generating ECU 4.

Figure 2:
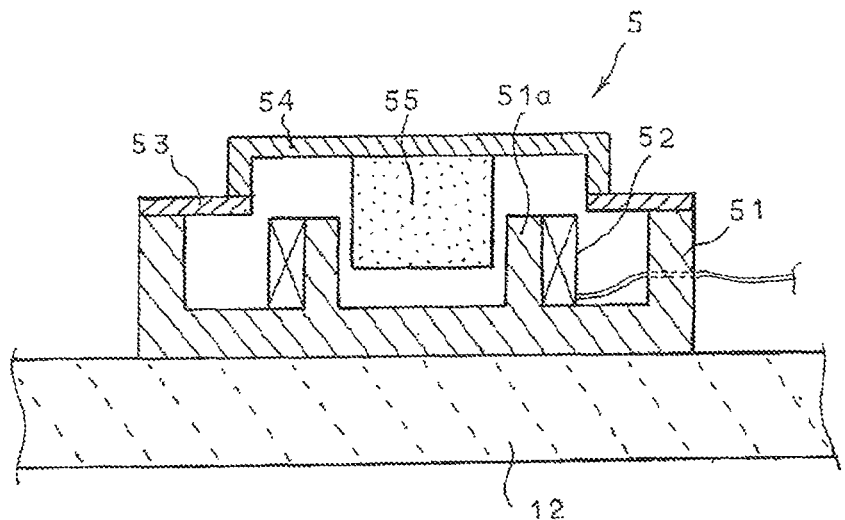
FIG. 2 is a cross-sectional view of an electron oscillator (a sound generating device).

As illustrated in FIG. 2, the electron oscillator 5 is configured by winding a driving coil 52 around a cylindrical shaped core 51a disposed in the inside of a body 51 of circular cylindrical vessel. An outer peripheral portion of a spring plate 53 of an annular plate shape is attached to an opening of the body 51, and a vibrating plate 54 is attached to an inner peripheral portion of the spring plate 53. A circular cylindrical shaped magnet (a permanent magnet) 55, which is entered into the cylinder of the cylindrical shaped core 51a, i.e., the inside of the driving coil 52, is integrally attached to the inner surface of the vibrating plate 54. The electron oscillator 5 is driven such that the magnet 55 is reciprocated in an axial direction of the cylinder of the cylindrical shaped core 51a by a magnetic field of the magnet 55 and an alternative magnetic field formed by the driving coil 52 by applying an alternative current to the driving coil 52. And the vibrating plate 54 which is integral with the magnet 52 makes the spring plate 53 to warp and reciprocates in the thickness direction, i.e., vibrating. The vibrations of the magnet 55 and the vibrating plate 54 are transferred to the front cover 12 through the body 51, and the front cover 12 is vibrated to generate a sound.

Figure 3:
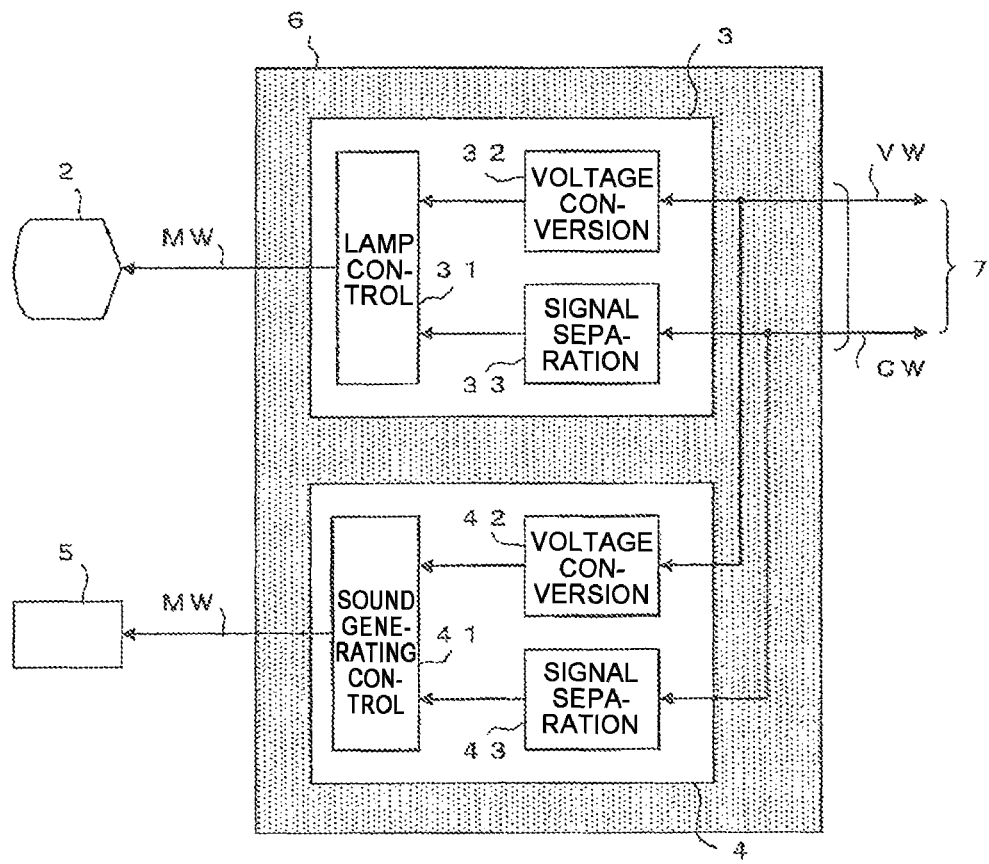
FIG. 3 is a block circuit diagram of the first exemplary embodiment.

FIG. 3 is a block circuit diagram including the lamp unit 2, the electron oscillator 5, the lamp ECU 3 and the sound generating ECU 4. It is characterized herein that the lamp ECU 3 and the sound generating ECU 4 are configured as a one complex ECU 6. For example, the lamp ECU 3 and the sound generating ECU 4 are constructed in a single circuit board and the entire circuit board is integrally formed into a package to form the complex ECU 6. Alternatively, the lamp ECU 3 and the sound generating ECU 4 are constructed in separate circuit boards, respectively, and both of the circuit boards may be integrally formed into a package to form the complex ECU 6. In either case, it is important that the package is configured by, for example, a resin molding which cannot be disassembled easily, and at least the circuit board of the sound generating ECU 4 is constituted in such a way that so called a remodeling such as a change of the circuit or a cut-off of a wire from the outside cannot be performed easily.

The complex ECU 6 is supported in the inside the lamp housing 1, as illustrated in FIG. 1, and is electrically connected to the lamp unit 2 and the electron oscillator 5 via driving lines MW, respectively. With respect to the complex ECU 6, as illustrated in FIG. 3, a common power source line VM and a common control line CW are connected to the lamp ECU 3 and the sound generating ECU 4, and the common power source line VW and the common control line CW are connected to a main ECU 7 provided in a vehicle after being inserted into a line inserting hole 14 formed in the lamp body 11 of the lamp housing 1. Various switches S1 operated by a driver or various sensors S2 including a vehicle speed sensor that detects a speed of a vehicle are connected to the main ECU 7, and a power or a control signal is output for the lamp ECU 3 and the sound generating ECU 4 based on the switching states of the various switches S1 or the detection outputs of the various sensors S2. Herein, with respect to the lamp ECU 3, a power for turning ON the lamp unit 2 is supplied via the common power source line VW, and a lamp control signal for turning ON the lamp unit 2 by turning ON a lighting switch is output via the common control line CW. Similarly, with respect to the sound generating ECU 4, a sound generating control signal and a power for driving the sound generating device according to the detection output of the vehicle speed sensor which detects the lower speed running of the vehicle, are output via the common power source line VW and the common control line CW. The common power source line VW is configured to conduct a predetermined voltage, and the common control line CW is configured to transfer the lamp control signal and the sound generating control signal as a multiplexed control signal.

As illustrated in FIG. 3, in the complex ECU 6, the lamp ECU 3 includes a lamp control circuit 31 for controlling the lighting state of the lamp unit 2 and the sound generating ECU 4 includes a sound generating control circuit 41 for controlling the sound generating of the electron oscillator 5. The lamp ECU 3 and the sound generating ECU 4 include voltage converting circuits 32, 42, respectively, and each of the voltage converting circuits 32, 42 converts voltages supplied from the common power source line VW into necessary voltages for turning ON the lamp and driving the electron oscillator, respectively. In this case, when, for example, the voltage for turning ON the lamp and the voltage for driving the electron oscillator are same as each other, the respective voltage converting circuits 32, 42 of the lamp ECU 3 and the sound generating ECU 4 may be omitted. Alternatively, when any one of the voltage for turning ON the lamp and the voltage for driving the electron oscillator is different from the supplied voltage, the voltage converting circuit may be formed only in the ECU side where the voltage is different from the supplied voltage. The lamp ECU 3 and the sound generating ECU 4 include signal separating circuits 33, 43, respectively, and each of the signal separating circuits 33, 43 separates the multiplexed control signal input from the common control line CW into control signals, for example, the lamp control signal and the sound generating control signal which are necessary for turning ON the lamp and driving the electron oscillator, respectively.

According to the first exemplary embodiment, the power supplied to the complex ECU 6 from the main ECU 7 through the common power source line VW is converted into a voltage for turning ON the lamp and a voltage for driving the electron oscillator in each of the voltage converting circuits 32, 42 of the lamp ECU 3 and the sound generating ECU 4. Further, the multiplexed control signal supplied to the complex ECU 6 from the main ECU 7 through the common control line CW is separated into a control signal for turning ON the lamp and a control signal for driving the electron oscillator in each of the signal separating circuits 33, 43 of the lamp ECU 3 and the sound generating ECU 4. As a result, when the control signal for turning ON the lamp is output from the main ECU 7, the lamp ECU 3 supplies the supplied power to the lamp unit 2 based on the control signal to turn ON the lamp unit 2. At this time, it is possible to control the swivel device or the leveling device, and also possible to control the lighting state of the DRL. When the driving signal for driving the electron oscillator 5 is output from the main ECU 7, the sound generating ECU 4 surely supplies the power to the electron oscillator 5 based on the driving signal to vibrate the electron oscillator 5 and the front cover 12 integrally, thereby generating a sound to perform an alarm.

When a driver wants to perform a remodeling for stopping the sound generating operation by the electron oscillator 5, since the complex ECU 6 is provided internally inside the lamp housing 1, the driving line MW which is connected from the complex ECU 6 to the electron oscillator 5 cannot be cut-off in an original state thereof. When the driving line MW is cut-off, the lamp housing 1 needs to be destroyed to destroy the head lamp HL. In the first exemplary embodiment, the lamp body 11 includes a back cover 11a which is difficult to be removed by an individual including a dealer. When any one of the common power source line VW and the common control line CW that are connected to the complex ECU 6 and the main ECU 7 is cut-off instead of cutting off the driving line MW, the supply of the power and the control signal to the sound generating ECU 4 is stopped, and the driving of the electron oscillator 5 is stopped to become a state where the sound generating is stopped. At this time, since the supply of the power and the control signal to the lamp ECU 3 is stopped at the same time of cutting-off of the common power source line VW and the common control line CW, the turning ON of the lamp unit 2 is stopped as well. As described above, when a driver performs a remodeling in order to stop the operation of the sound generating of the sound generating device, since the head lamp HL is not turned ON normally, the remodeling for stopping the sound generating by the driver may be prevented in advance. Accordingly, the normal sound generating is performed by the sound generating device 5 to ensure the safety running of the vehicle.

Even though the lamp ECU 3 and the sound generating ECU 4 each includes the voltage converting circuits 32, 42 and the signal separating circuits 33, 43, respectively, in the first exemplary embodiment, a voltage converting circuit and a signal separating circuit may be formed as independent circuits and a converted voltage or a branched control signal may be output to the lamp ECU 3 and the sound generating ECU 4, respectively. In this case, the configurations of the lamp ECU 3 and the sound generating ECU 4 may be simplified. Even though the voltage converting circuit and the signal separating circuit are formed as independent circuits, the voltage converting circuit and the sound generating circuit may well be formed into a package along with the lamp ECU 3 and the sound generating ECU 4.

Even though the complex ECU 6 is disposed within the lamp housing 1 in the first exemplary embodiment, a complex ECU 6 may be provided outside the lamp housing 1. However, in this case, the driving line MW should not easily be cut-off which connects the complex ECU 6 and the sound generating device (electron oscillator) 5. For example, the driving line MW may be formed integrally or in a one-piece shape with respect to the lamp body 11 so as not to remove the complex ECU 6 from the lamp body 11 such that the driving line MW is not exposed outside the lamp housing 1.

Second Exemplary Embodiment

Figure 4:
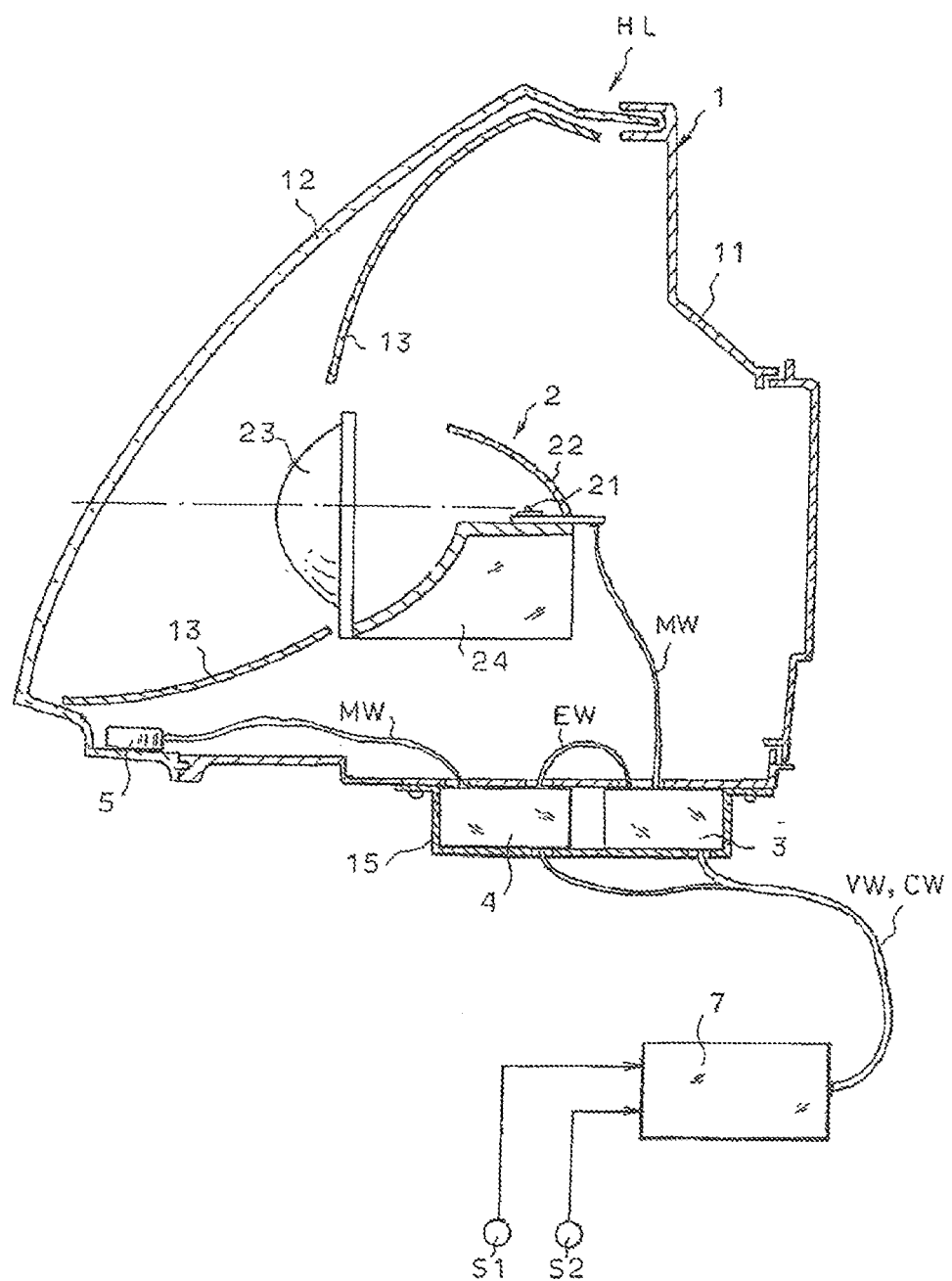
FIG. 4 is a longitudinal cross-sectional view of a head lamp according to a second exemplary embodiment of the present disclosure.

A second exemplary embodiment is a suitable example for a case where a lamp ECU and a sound generating ECU are difficult to be integrated into a complex ECU. FIG. 4 is a longitudinal cross-sectional view of a head lamp HL according to the second exemplary embodiment, and the like portions as in the first exemplary embodiment have the same reference numerals, respectively. In the present example, each of the lamp ECU 3 and the sound generating ECU 4 is formed as an independent ECU, and is supported inside or outside a lamp housing 1 by a support bracket 15 on the bottom surface of a lamp body 11. Each of the ECUs 3, 4 is connected to a lamp unit 2 and an electron oscillator 5, respectively, via a driving line MW that passes through the lamp body 11. Also, each of the ECUs 3, 4 is connected to a main ECU 7, which has the same configuration as in the first exemplary embodiment, via a respective power source line VW and a respective control line CW. That is, power is supplied to each of the lamp ECU 3 and the sound generating ECU 4 from the main ECU 7 via respective power source lines VW, and similarly, control signal is input from the main ECU 7 via respective control lines CW. The lamp ECU 3 turns ON the lamp unit 2 based on the control signal and the power from the main ECU 7. Further, the sound generating ECU 4 performs the sound generating by driving the electron oscillator 5 based on the control signal and the power from the main ECU 7.

Figure 5:
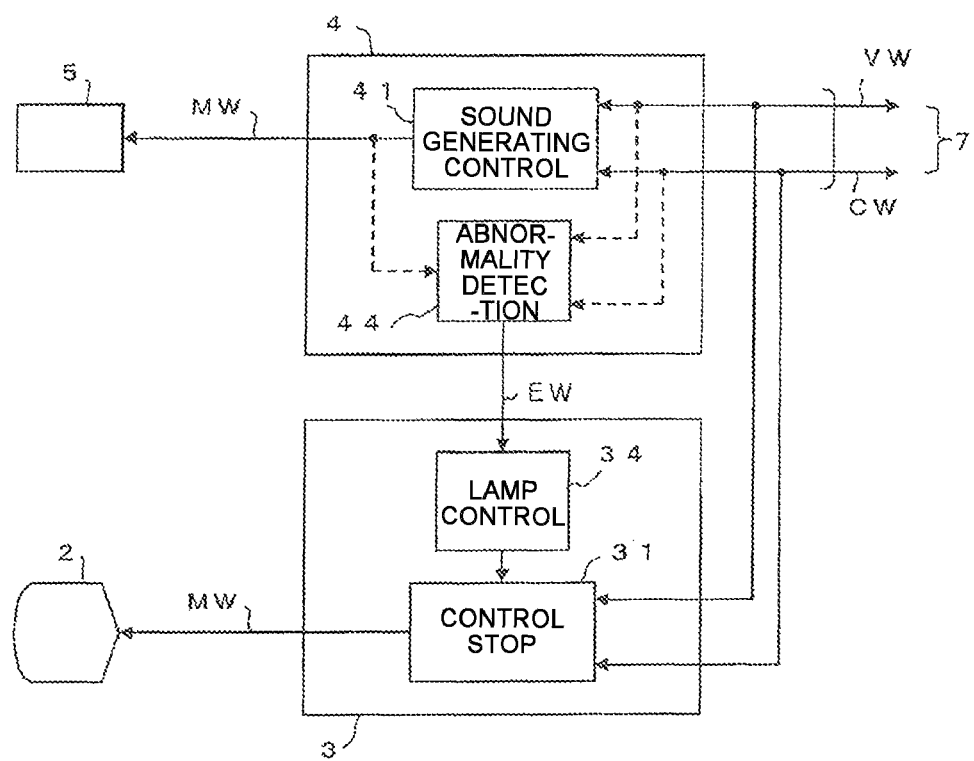
FIG. 5 is a block circuit diagram of the second exemplary embodiment.

In the second exemplary embodiment, as illustrated in a block circuit diagram in FIG. 5, the sound generating ECU 4 includes an abnormality detecting circuit 44 and the sound generating ECU 4 is electrically connected to the lamp ECU 3 through an abnormality detecting line EW. The abnormality detecting circuit 44 is used to detect the cut-off of the power source line VW, the control line CW, and the driving line MW. For example, the abnormality detecting circuit 44 is configured to monitor electric potentials of the power source line VW, the control line CW, and the driving line MW at all times, detect the changes of the electric potential of each line to detect the cut-off of a line when the corresponding line is cut-off, and output an abnormality signal. As a specific example even though not illustrated, a condenser may be connected in parallel to each of the power source line VW, the control line CW, and the driving line MW. And when a corresponding line is cut-off, the cut-off is detected by detecting the change of the voltages at both ends of the condenser accompanied by a self discharge. The lamp ECU 3 includes a control stopping circuit 34 for stopping the lighting of the lamp unit 2, and a lamp control circuit 31 of the lamp ECU 3 is configured to stop the lighting control of the lamp unit when the abnormality signal is input from the abnormality detecting circuit 44 of the sound generating ECU 4. Herein, the lamp control circuit 31 is controlled such that the lamp unit 2 is not turned ON when the abnormality signal is input.

According to the second exemplary embodiment, the lamp ECU 3 turns ON the lamp unit 2 using the power supplied to the lamp ECU 3 from the main ECU 7 via the power source line VW and the control signal input to the lamp ECU 3 from the main ECU 7 via the control line CW. At this time, it is possible to control a swivel device or a leveling device, and control the lighting state of a DRL. As in the first exemplary embodiment, the sound generating ECU 4 drives the electron oscillator 5 to generate a sound using the power supplied to the sound generating ECU 4 from the main ECU 7 via the power line VW and the control signal input to the sound generating ECU 4 from the main ECU 7 via the control line CW, thereby performing an alarm by the sound generating.

When a driver performs a remodeling for stopping the sound generating operation in the sound generating device, that is, when any one of the power source line VW, the control line CW, and the driving line MW connected to the sound generating ECU 4 is cut-off, the cutting-off is detected in the abnormality detecting circuit 44 of the sound generating ECU 4 to output an abnormality signal to the lamp ECU 3. As a result, the lamp control circuit 31 of the lamp ECU 3 makes the lighting control of the lamp unit 2 to be stopped based on the abnormality signal. Accordingly, in this case, the sound generating by the sound generating device 5 stops. However, when such a remodeling is performed, since the lighting of the head lamp HL is impossible during a driving at night, the driver cannot imagine try performing such a remodeling.

In the second exemplary embodiment, when any one of the lines to be connected to the sound generating ECU 4 is cut-off, the lighting of the head lamp HL is impossible. However, if the driving line MW that connects the sound generating ECU 4 and the electron oscillator 5 is made impossible to be physically cut-off as in the first exemplary embodiment, the abnormality detecting circuit 44 provided in the sound generating ECU 4 may be configured to detect the cut-off only for the power source line VW and the control line CW. As a result, the abnormality detecting circuit 44 may be simplified, and further it is advantageous that the configuration of the sound generating ECU 4 is simplified. Further, when a predetermined current and voltage are always supplied to the control stopping circuit 34 of the lamp ECU 3 from the abnormality detecting circuit 44 of the sound generating ECU 4, even though the abnormality detecting line EW is cut-off, the control stopping circuit 34 can stop the control of the lamp control circuit 31.

Herein, it may be configured that the abnormality detecting circuit 44 detects a case where a vibration at a preset level in the electron oscillator 5 is not performed even if a predetermined control signal is input, as an abnormal state. In a case where a remodeling is performed in which the electron oscillator 5 itself is made to make the alarm sound to be lowered according to a specific method, as long as the abnormality detecting circuit 44 detects that the sound generating is not performed at a predetermined tone corresponding to the control signal, such remodeling may be prevented.

The present disclosure is applied to a head lamp, and specifically, to a lamp unit of a headlamp with a low-bean distribution in the first and second exemplary embodiments. However, the present disclosure may be applied to a lamp unit with a high-beam distribution, or may be applied to an illuminating lamp other than a head lamp or an indicating lamp such as a rear lamp and others. The present disclosure may be applied to a lamp as long as the lamp includes a sound generating device according to the present disclosure. That is, the present disclosure may be applied to a lamp as long as the lighting state of the lamp is changed when the sound generating device is remodeled, and thus, the normal miming of a vehicle is not ensured. Further, the sound generating device of the present disclosure is not limited to a case where the electron oscillator that electronically oscillates is used as an oscillator, as described in the exemplary embodiments, but the present disclosure may well be applied to a sound generating device that uses a magnetostriction element as an oscillator. Alternatively, a device may generate a sound using a lamp according to another method.

The present disclosure may be adopted to a lamp of a vehicle that includes a sound generating device.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicular lamp comprising:
   a lamp installed in a vehicle;
   a lamp control unit configured to control the lighting state of the lamp;
   a sound generating device installed in the lamp and configured to generate an alarm sound from the lamp when the sound generating device is driven; and
   a sound generating control unit configured to control the sound generating device,
   wherein the lamp control unit is configured to make a normal operation thereof to be impossible when the sound generating control unit is not operated normally.

2. The vehicular lamp of claim 1, wherein the lamp control unit and the sound generating control unit are integrally formed into a package, and
   a common power source line that supplies a power to the lamp control unit and the sound generating control unit, and a common control line that controls the lamp control unit and the sound generating control unit, are drawn out of the package.

3. The vehicular lamp of claim 1, wherein the sound generating control unit comprises an abnormality detecting unit configured to detect an abnormality of the sound generating control unit, and
   the lamp control unit comprises a control stopping unit configured to stop the operation of the lamp control unit based on an abnormality detection signal from the abnormality detecting unit of the sound generating control unit.

4. The vehicular lamp of claim 1, wherein the sound generating device is constituted by an electron oscillator configured to generate a vibration by an electro-magnetic action.

5. The vehicular lamp of claim 2, wherein the sound generating device is constituted by an electron oscillator configured to generate a vibration by an electro-magnetic action.

6. The vehicular lamp of claim 3, wherein the sound generating device is constituted by an electron oscillator configured to generate a vibration by an electro-magnetic action.

* * * * *